United States Patent [19]

Deller et al.

[11] Patent Number: 5,021,378

[45] Date of Patent: Jun. 4, 1991

[54] MOLDED ARTICLES BASED ON PYROGENICALLY PREPARED SILICON DIOXIDE, PROCESS FOR THEIR PRODUCTION AND THEIR USE

[75] Inventors: Klaus Deller, Hainburg; Reinhard Klingel, Alzenau; Helmfried Krause, Rodenbach, all of Fed. Rep. of Germany

[73] Assignee: Degussa Aktiengesellschaft, Fed. Rep. of Germany

[21] Appl. No.: 488,379

[22] Filed: Feb. 23, 1990

Related U.S. Application Data

[63] Continuation of Ser. No. 308,125, Feb. 9, 1989, abandoned.

[30] Foreign Application Priority Data

Feb. 9, 1988 [DE] Fed. Rep. of Germany ....... 3803895

[51] Int. Cl.$^5$ .................. B01J 21/12; B01J 21/16; B01J 21/18
[52] U.S. Cl. ........................ 502/62; 502/63; 502/80; 502/263; 502/413
[58] Field of Search ............ 502/62, 63, 84, 407, 502/232, 263, 413

[56] References Cited

U.S. PATENT DOCUMENTS 4,325,846  4/1982  Shibata ................. 502/62
4,764,498  8/1988  Wissner et al. ........ 502/232

FOREIGN PATENT DOCUMENTS 4490  1/1977  Japan ................. 502/232

*Primary Examiner*—Carl F. Dees
*Attorney, Agent, or Firm*—Beveridge, DeGrandi & Weilacher

[57] ABSTRACT

Molded articles based on pyrogenically prepared silicon dioxide and having the following physical-chemical characteristic data:

| | |
|---|---|
| External diameter | 2 to 15 mm |
| BET surface area | 50 to 400 m$^2$/g |
| Total Pore volume | 0.6 to 1.3 ml/g |
| Crushing strength | 40 to 120 N |
| Pore size distribution | no pores <5 nm in diameter, at least 80% in the range 5 to 40 nm in diameter |
| Composition | >95% by weight of SiO$_2$ remainder Al$_2$O$_3$. |

These products are produced by compacting pyrogenically prepared silicon dioxide with kaolin and/or graphite, sugar, starch, urea or wax with addition of water, drying the mixture at a temperature of from 80° to 120° C. and comminuting it to form a powder, pressing the powder to form the desired article, and tempering the articles at a temperature of from 400° to 1200° C. for a period of 0.5 to 6 hours. The molded bodies can be used as a catalyst support or catalyst.

6 Claims, No Drawings

MOLDED ARTICLES BASED ON PYROGENICALLY PREPARED SILICON DIOXIDE, PROCESS FOR THEIR PRODUCTION AND THEIR USE

This application is a continuation of Ser. No. 308,125 filed Feb. 9, 1989 and now abandoned.

INTRODUCTION AND BACKGROUND

The present invention relates to molded articles based on pyrogenically prepared silicon dioxide, process for their production and their use as a catalyst support or catalyst.

Pyrogenically prepared silicon oxides are distinguished by being extremely finely divided and by a correspondingly high specific surface area, very high purity, a spherical particle shape and the lack of pores. Due to these properties, pyrogenically prepared oxides are becoming increasingly important as supports for catalysts; see D. Koth, H.. Ferch, Chem. Ing. Techn. 52, 628 (1980).

Since pyrogenically prepared oxides are particularly finely divided in nature, shaping of such powders to form catalyst supports or catalysts causes some difficulties.

German OLS 31 32 674 discloses a process for the production of molded articles from pyrogenically prepared oxides in which silica sol is uses as binder.

German OLS 34 06 185 discloses a process for the production of molded bodies by using glaze frit powder as a binder and glycerol as a lubricant.

German Patent 21 00 778 discloses employing granules based on pyrogenically prepared silicon dioxides as catalyst support used in processes for the preparation of, for example, vinyl acetate monomer.

These known processes have the disadvantage that the molded bodies so obtained do not have the optimum properties desired, such as, for example, high crushing strength, for certain catalytic reactions, i.g. the preparation of vinyl acetate from ethylene, acetic acid and oxygen or the hydration of ethylene to form ethanol.

SUMMARY OF THE INVENTION

An object of the present invention is to provide molded bodies based on pyrogenically prepared silicon dioxide and having the following physical-chemical characteristic data:

| External diameter | 2 to 15 mm |
| --- | --- |
| BET surface area | 50 to 400 m²/g |
| Total Pore volume | 0.6 to 1.3 ml/g |
| Crushing strength | 40 to 120 N |
| Pore size distribution | no pores <5 nm in diameter, at least 80% in the range 5 to 40 nm in diameter |
| Composition | >95% by weight of $SiO_2$ remainder $Al_2O_3$. |

Another object of the invention is to provide a process for the production of molded articles based on pyrogenically prepared silicon dioxide and having the following physical-chemical characteristic data:

| External diameter | 2 to 15 mm |
| --- | --- |
| BET surface area | 50 to 400 m²/g |
| Total pore volume | 0.6 to 1.3 ml/g |
| Crushing strength | 40 to 120N |
| Pore size distribution | no pores <5 nm in diameter, at least 80% in the range 5 to 40 nm in diameter |
| Composition | >95% by weight of $SiO_2$ remainder $Al_2O_3$ | which comprises homogenizing pyrogenically prepared silicon dioxide with kaolin and/or graphite, sugar, starch, urea or wax while adding water to the resulting mixture, drying the mixture so obtained at a temperature of from 80° to 120° C. and comminuting it to form a powder. Then the powder is pressed to form molded bodies or articles and the molded articles are tempered by heating at a temperature of from 400° to 1200° C. for a period of 0.5 to 6 hours.

In principle, all mixer apparatus or mills which enable good homogenization, such as, for example, paddle mixers, fluidized bed mixers, rotary mixers or airstream mixers, are suitable for carrying out the process according to the invention. Mixers by means of which it is possible to additionally compact the mixing material, for example plow blade mixers, chaser mills or ball mills, are particularly suitable. After homogenization, substantial drying at 80°-20° C. can be carried out so that a free-flowing powder is obtained after comminution. The molded articles can be produced by die stamping, eccentric pressing, extrusion or rotary pressing and in compactors. The shape of the molded articles can vary, for example, pellets, rods, or annular members e.g. rings. These shapes are well known in the field of catalytic supports.

In a particular embodiment of the invention, the mixture can have the following composition before pressing:

50-90% by weight of silicon dioxide, preferably 70-80% by weight 0.1-8% by weight of kaolin, preferably 1-5% by weight, and/or 0.1-10% by weight of graphite, preferably 1-5% by weight, 0.1-10% by weight of wax, preferably 1-5% by weight, 5-45% by weight of pore formers, such as urea, sugar or starch, preferably 10-30% by weight.

The molded bodies can have various shapes, for example cylindrical, spherical or annular, with an external diameter or from 2 to 15 mm.

Tempering of the molded articles is carried out by heating at 400°-1200° C. for 30 minutes to 6 hours.

By varying the amounts of starting materials and the pressing pressure, the crushing strength, the specific surface area and the pore volume can be modified within certain limits.

The molded articles prepared according to the invention can be used either directly as catalysts or as catalyst supports after the moldings have been impregnated, during or after their production, with a solution of a catalytically active substance and, if appropriate, have been activated by suitable after treatment. The compositions and procedures for deposition of catalytically active substances are well known in industry.

In particular, the molded articles made from pyrogenically prepared silicon dioxide can be used particularly well when used as the support for the catalyst used in the preparation of vinyl acetate monomer from ethylene, acetic acid and oxygen and as the catalyst in the hydration of ethylene.

The molded articles produced according to the invention have the following advantages:
High strength.
Large pore volume.
The majority of the pores are in the mesopore range.
No pores <5 nm.

DETAILED DESCRIPTION OF THE INVENTION

Examples

The pyrogenically prepared silicon dioxide is a silicon dioxide having the following physical-chemical characteristic data:

| Silica (Aerosil) | 130 | 150 | 200 | 300 | 380 |
|---|---|---|---|---|---|
| BET surface area m$^2$/g | 130 ± 25 | 150 ± 15 | 200 ± 25 | 300 ± 30 | 380 ± 30 |
| Mean size of the primary particles nm | 16 | 14 | 12 | 7 | 7 |
| Compacted density[1] g/l | ca. 50 | ca. 50 | ca. 50 | ca. 50 | ca. 50 |
| Loss on drying[2] (2 hours at 105° C.) % | <1.5 | <0.5[7] | <1.5 | <1.5 | <1.5 |
| Ignition Loss[2,5] (2 hours at 1000° C.) % | <1 | <1 | <1 | <2 | <2.5 |
| pH[3] (in 4% aqueous dispersion) | 3.6–4.3 | 3.6–4.3 | 3.6–4.3 | 3.6–4.3 | 3.6–4.3 |
| SiO$_2$[6] % | >99.8 | >99.8 | >99.8 | >99.8 | >99.8 |
| Al$_2$O$_3$[6] % | <0.05 | <0.05 | <0.05 | <0.05 | <0.05 |
| Fe$_2$O$_3$[6] % | <0.003 | <0.003 | <0.003 | <0.003 | <0.003 |
| TiO$_2$[6] % | <0.03 | <0.03 | <0.03 | <0.03 | <0.03 |
| HCl[6,8] % | <0.025 | <0.025 | <0.025 | <0.025 | <0.025 |
| Sieving residue[4] (by the method of Mokker, 45 μm) % | <0.5 | <0.5 | <0.5 | <0.5 | <0.5 |

[1]in accordance with DIN 53 194
[2]in accordance with DIN 55 921
[3]in accordance with DIN 53 200
[4]in accordance with DIN 53 580
[5]based on the substance dried for 2 hours at 105
[6]based on the substance ignited for 2 hours at 1000° C.
[7]
[8]HCl content is part of the ignition loss To prepare the silica(AEROSIL), a volatile silicon compound is atomized into an oxyhydrogen flame comprising hydrogen and air. In most cases, silicon tetrachloride is used. This substance hydrolyzes under the influence of the water produced in the oxyhydrogen gas reaction to form silicon dioxide and hydrochloric acid. After leaving the flame, the silicon dioxide enters a so-called coagulation zone, in which the silica(AEROSIL) primary particles and primary aggregates agglomerate. The product, which at this stage is in the form of a type of aerosol, is separated in cyclones from the gaseous accompanying substances and subsequently after treated with moist hot air. This process reduces the residual hydrochloric acid content to below 0.025%. Since, at the end of this process, the silica(AEROSIL) is produced with a bulk density of only about 15 g/l, the process is followed by a vacuum compression stage, by means of which compacted densities of about 50 g/l and more can be produced.

The particle sizes of the products obtained in this way can be varied using the reaction conditions. Such parameters are, for example, the flame temperature, the proportions of hydrogen and oxygen, the amount of silicon tetrachloride, the residence time in the flame or the length of the coagulation zone.

The BET surface area is determined in accordance with DIN 66 131 using nitrogen.

The pore volume is computed from the sum of the micropore, mesopore and macropore volumes.

The breaking strength is determined using a breaking tester from Ewerka Co., type TBH 28.

The micropores and mesopores are determined by recording an N$_2$ isotherm and evaluating same by the method BET, de Boer and Barret, Joyner, Halenda.

The macropores are determined by the Hg penetration method. Any suitable pyrogenically prepared silica can be used for purposes of the invention although the above silica(AEROSIL) is preferred.

DETAILED DESCRIPTION OF THE INVENTION

Example 1

77% by weight of silica(Aerosil 200)
4% by weight of graphite
4% by weight of kaolin and
15% by weight of sugar are compacted with addition of water, dried at 100° C. for 24 hours, comminuted, to form a free-flowing product and pressed on an eccentric press to form pellets.

The crude pellets are tempered by heating at 900° C. for 4 hours.

The pellets obtained have the following physical-chemical characteristic data:

| | |
|---|---|
| External diameter | 9 mm |
| BET surface area | 192 m$^2$/g |
| Total pore volume | 1.28 ml/g |
| Breaking strength | 45N |
| Pore size distribution | no pores <5 nm in diameter, 81% of the pores in the range 5 to 40 nm in diameter |
| Composition | 97.5% by weight of SiO$_2$ 2.5% by weight of Al$_2$O$_3$ |

Example 2

77% by weight of silica(Aerosil 200)
4% by weight of graphite
4% by weight of kaolin and
15% by weight of starch and molded into pellets as in Example 1.

The pellets obtained have the following physical-chemical characteristic data:

| | |
|---|---|
| External diameter | 9 mm |
| BET surface area | 195 m²/g |
| pore volume | 1.16 ml/g |
| Breaking strength | 58N |
| Pore distribution | no pores <5 nm in diameter, 81% of the pores in the range 5 to 40 nm in diameter |
| Composition | 97.5% by weight of SiO$_2$ 2.5% by weight of Al$_2$O$_3$ |

Example 2

77% by weight of silica(Aerosil 380)
19% by weight of urea
4% by weight of wax are molded to form pellets as in Example 1.

The tempering is carried out at 700° C.

The pellets obtained have the following physical-chemical characteristic data:

| | |
|---|---|
| External diameter | 5 mm |
| BET surface area | 345 m²/g |
| Total pore volume | 1.07 ml/g |
| Breaking strength | 42N |
| Pore size distribution | no pores <5 nm in diameter, 88% of the pores in the range 5 to 40 nm in diameter |
| Composition | 97.5% by weight of SiO$_2$ 2.5% by weight of Al$_2$O$_3$ |

Further variations and modifications of the foregoing will be apparent to those skilled in the art from the foregoing and are intended to be encompassed by the appended claims.

German priority application P 38 03 895.1-45 is relied on and incorporated herein.

We claim:

1. A molded article based on pyrogenically prepared silicon dioxide and having the following physical-chemical characteristic data:

| | |
|---|---|
| External diameter | 2 to 15 mm |
| BET surface area | 50 to 400 m²/g |
| Total pore volume | 0.6 to 1.3 ml/g |
| Crushing strength | 40 to 120 N |
| Pore size distribution | no pores <5 nm in diameter at least 80% of the pores in the range 5 to 40 nm in diameter |
| Composition | >95% by weight of SiO$_2$ remainder Al$_2$O$_3$. |

2. A process for the production of molded article based on pyrogenically prepared silicon dioxide and having the following physical-chemical characteristic data:

| | |
|---|---|
| External diameter | 2 to 15 mm |
| BET surface area | 50 to 400 m²/g |
| Total pore volume | 0.6 to 1.3 ml/g |
| Crushing strength | 40 to 120 N |
| Pore size distribution | no pores <5 nm in diameter at least 80% of the pores in the range 5 to 40 nm in diameter |
| Composition | >95% by weight of SiO$_2$ remainder Al$_2$O$_3$. | which comprises homogenizing pyrogenically prepared silicon dioxide with kaolin and/or graphite, sugar, starch, urea or wax in the presence of water, drying the mixture at a temperature of from 80° to 120° C. and comminuting it to form a powder, pressing the powder to form a molded article, and tempering the molded article at a temperature of from 400° to 1200° C. for a period of 0.5 to 6 hours.

3. A catalyst support comprising the molded article of claim 1 in the shape of a pellet, rod or annular ring.

4. A catalyst comprising the catalyst support of claim 3 having a catalytically active substance deposited thereon.

5. A process for the production of molded article based on pyrogenically prepared silicon dioxide and having the following physical-chemical characteristic data:

| | |
|---|---|
| external diameter | 2 to 15 mm |
| BET surface area | 50 to 400 m²/g |
| total pore volume | 0.6 to 1.3 ml/g |
| crushing strength | 40 to 120 N |
| pore size distribution | no pores <5 nm in diameter, at least 80% of the pores in the range 5 to 40 nm in diameter |
| composition | >95% by weight of SiO$_2$ remainder Al$_2$O$_3$ | which comprises homogenizing 50–90% by weight of pyrogenically prepared silicon dioxide with 0–8.0% by weight of kaolin, 0–10.0% by weight of graphite, 0–10.0% by weight of wax, and 5–45% by weight of at least one pore former selected from the group consisting of urea, sugar and starch, in the presence of water, drying the mixture at a temperature of from 80° to 120° C. and comminuting it to form a powder, pressing the powder to form a molded article, and tempering the molded article at a temperature of from 400° to 1200° C. for a period of 0.5 to 6 hours.

6. A process according to claim 5, wherein said silicon dioxide is 70–80% by weight, said kaolin is 1–5% by weight, said graphite is 1–5% by weight, said wax is 1–5% by weight, and said pore former is 10–30% by weight.

* * * * *